United States Patent
Walter

(10) Patent No.: US 9,188,129 B2
(45) Date of Patent: Nov. 17, 2015

(54) COMPRESSOR OF AN EXHAUST-GAS TURBOCHARGER

(75) Inventor: Norbert Walter, Ludwigshafen (DE)

(73) Assignee: BorgWarner Inc., Auburn Hills, MI (US)

( * ) Notice: Subject to any disclaimer, the term of this patent is extended or adjusted under 35 U.S.C. 154(b) by 400 days.

(21) Appl. No.: 13/699,315

(22) PCT Filed: May 24, 2011

(86) PCT No.: PCT/US2011/037646
§ 371 (c)(1),
(2), (4) Date: Nov. 21, 2012

(87) PCT Pub. No.: WO2011/153021
PCT Pub. Date: Dec. 8, 2011

(65) Prior Publication Data
US 2013/0071241 A1    Mar. 21, 2013

(30) Foreign Application Priority Data
Jun. 4, 2010  (DE) .......................... 10 2010 022 758

(51) Int. Cl.
| | | |
|---|---|---|
| F01D 25/24 | (2006.01) | |
| F04D 19/00 | (2006.01) | |
| F02C 7/045 | (2006.01) | |
| F02M 35/12 | (2006.01) | |
| F04D 29/42 | (2006.01) | |
| F04D 29/66 | (2006.01) | |
| F04D 29/68 | (2006.01) | |

(52) U.S. Cl.
CPC .............. *F04D 19/00* (2013.01); *F01D 25/24* (2013.01); *F02C 7/045* (2013.01); *F02M 35/1266* (2013.01); *F02M 35/1288* (2013.01); *F04D 29/4213* (2013.01); *F04D 29/667* (2013.01); *F04D 29/685* (2013.01); *F05D 2220/40* (2013.01); *F05D 2260/96* (2013.01); *F05D 2260/963* (2013.01)

(58) Field of Classification Search
CPC ..... F04D 19/00; F04D 29/667; F04D 29/685; F04D 29/4213; F05D 2220/40; F05D 2220/96; F05D 2220/963
USPC .......................................... 415/119, 205, 206
See application file for complete search history.

(56) References Cited

U.S. PATENT DOCUMENTS

| | | | |
|---|---|---|---|
| 4,482,304 A | | 11/1984 | Brobeck et al. |
| 5,295,785 A | * | 3/1994 | Church et al. ............... 415/58.3 |
| 5,399,064 A | | 3/1995 | Church et al. |
| 6,623,239 B2 | | 9/2003 | Sahay et al. |
| 8,465,251 B2 | * | 6/2013 | Hosoya et al. ............... 415/58.2 |
| 8,690,524 B2 | * | 4/2014 | Yin et al. ....................... 415/119 |
| 8,882,444 B2 | * | 11/2014 | Williams et al. ............. 415/58.4 |
| 2008/0056882 A1 | * | 3/2008 | Clay et al. .................... 415/55.6 |

FOREIGN PATENT DOCUMENTS

JP        200985083 A   *  4/2009   .............. F04D 29/42

* cited by examiner

*Primary Examiner* — Nathaniel Wiehe
*Assistant Examiner* — Woody A Lee, Jr.
(74) *Attorney, Agent, or Firm* — A. Michael Tucker; Stephan A. Pendorf; Patent Central LLC

(57) ABSTRACT

The invention relates to a compressor (1) of an exhaust-gas turbocharger (ATL), having a compressor housing (3) which has a housing inlet connecting piece (20) and a noise ring (21). The noise ring (21) is arranged in the housing inlet connecting piece (20) and is provided, on its outer circumference (22), with a multiplicity of chambers (23, 24, 23', 24').

9 Claims, 2 Drawing Sheets

COMPRESSOR OF AN EXHAUST-GAS TURBOCHARGER

Figure 1:
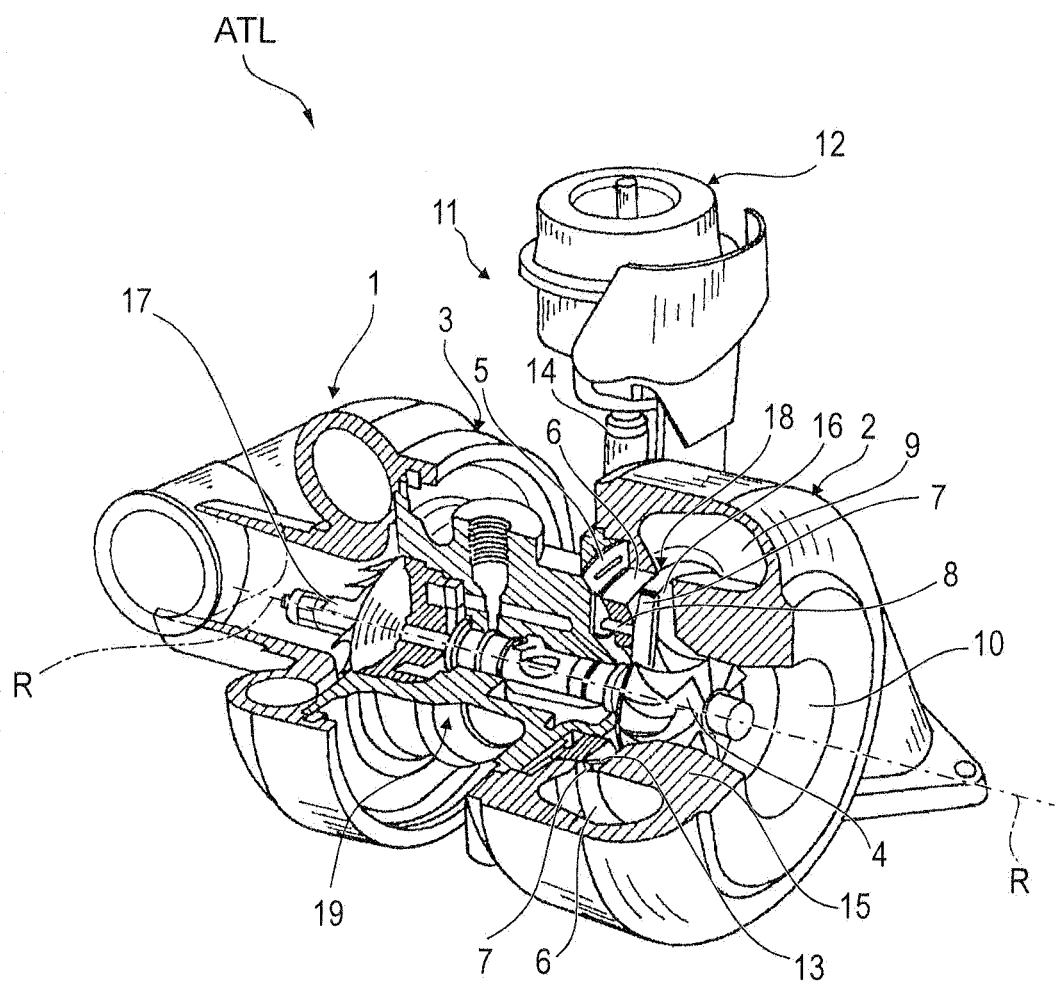

The invention relates to a compressor of an exhaust-gas turbocharger according to the preamble of claim 1.

Turbochargers with characteristic-map-stabilizing measures are used primarily in utility vehicle applications. Said turbochargers generate noticeable and disturbing rotational noise on account of the specific geometry of said measures. To reduce this rotational noise, use is presently made of so-called noise rings in the inlet connecting piece of the compressor.

It is an object of the present invention to provide a compressor of an exhaust-gas turbocharger according to the preamble of claim 1 which permits a further noise reduction in relation to known compressors.

Said object is achieved by means of the features of claim 1.

Accordingly, the noise ring within the characteristic-map-stabilizing apparatus is provided with a multiplicity of chambers or grooves or openings which form quarter lambda resonators for noise reduction.

This yields not only the desired noise reduction but also the advantage that, with said measure, the external dimensions and the pressure losses of the noise ring are not increased. Furthermore, by means of different dimensions with regard to axial depth, height and width of the quarter lambda resonators, the noise reduction is obtained over a broad frequency or rotational speed range. The dimensions and the number of resonators or chambers may be varied depending on the application for the purpose of influencing the overall volume of the chambers. It is also possible, to influence different quarter lambda frequencies caused by different turbocharger rotational speeds, to combine differently designed resonators/chambers in the noise ring.

The subclaims relate to advantageous refinements of the invention.

Figure 2:
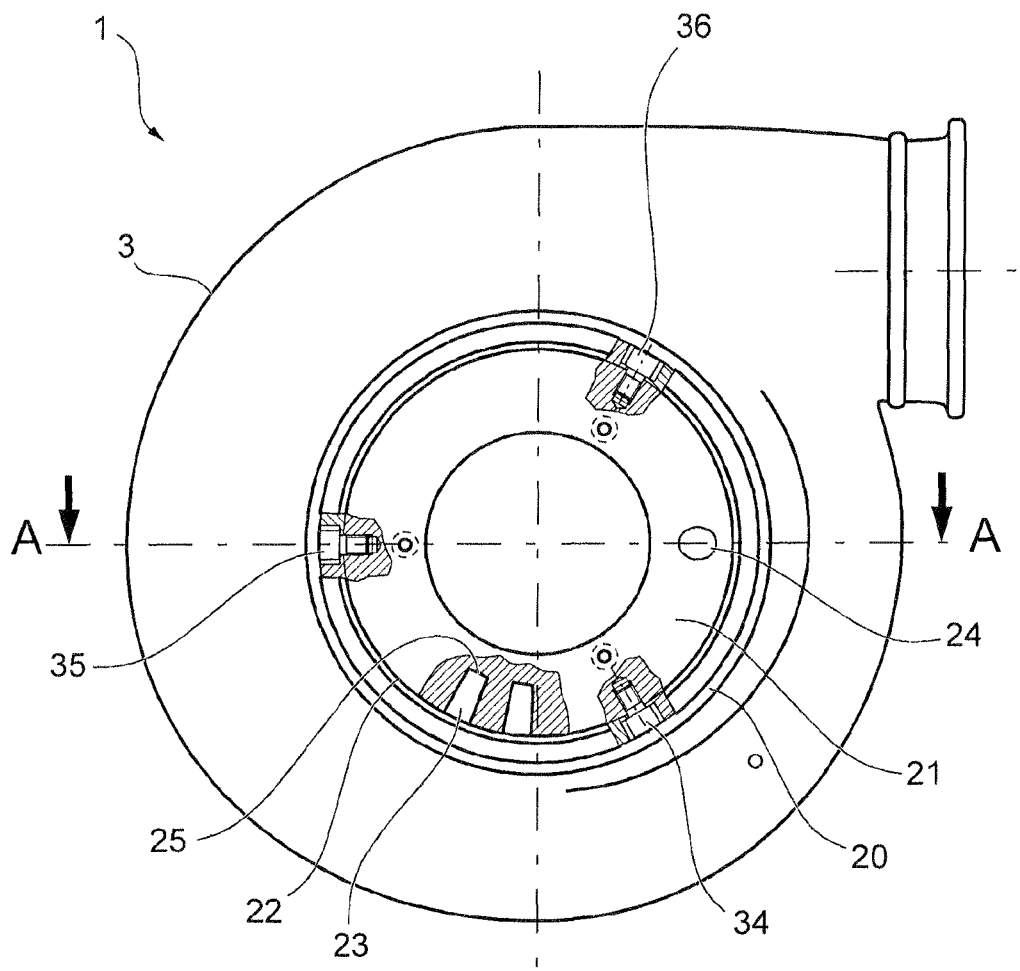
Figure 3:
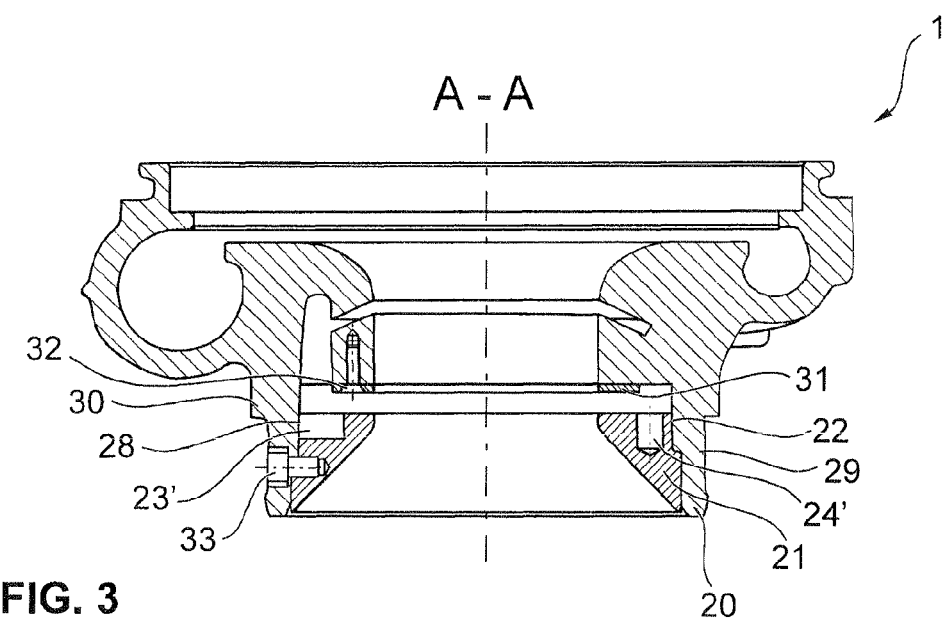

Further details, features and advantages of the invention will emerge from the following description of exemplary embodiments on the basis of the drawing, in which:

FIG. 1 shows a perspective, partially cut-away illustration of a turbocharger according to the invention which may be provided with a compressor according to the invention, FIG. 2 shows a plan view of the compressor according to the invention in the direction of the housing inlet connecting piece of the compressor housing, and FIG. 3 shows a sectional illustration of the compressor housing along the line A-A in FIG. 2.

FIG. 1 illustrates by way of example an exhaust-gas turbocharger ATL which may be provided with a compressor 1 according to the invention, which will be described in detail below on the basis of FIGS. 2 and 3.

In FIG. 1, said compressor 1 is illustrated with its compressor housing 3, with a compressor wheel 17, with a turbine housing 2 with a turbine wheel 4, and with a bearing housing 19 for mounting the turbine wheel 4. Said exhaust-gas turbocharger ATL is intended to represent merely an example of a possible embodiment of turbochargers which can be provided with the compressor 1 according to the invention, such that with regard to all other reference symbols of FIG. 1, reference may be made to the list of reference symbols, because a detailed description of said features is not required for the explanation of the invention explained in detail below on the basis of FIGS. 2 and 3.

FIG. 2 illustrates the compressor 1 with its compressor housing 3. The compressor housing 3 has a housing inlet connecting piece 20 and a noise ring 21 which is arranged in the housing inlet connecting piece 20. The noise ring 21 comprises a multiplicity of chambers 23, 24, 23', 24', wherein the chambers 23, 24, 23', 24' open at least in the axial direction toward the compressor wheel 17 (not illustrated in FIGS. 2 and 3). To obtain as large a chamber volume as possible in a given installation space, the chambers may additionally be open toward the outer circumference 22.

Furthermore, the chambers 23, 23' may have a rounded base region 25 owing to the production processes of milling, grinding or drilling, as illustrated in FIG. 2.

It is also possible for the chambers to consist of axial bores 24, 24' which do not have an opening toward the outer circumference 22, as can be seen in particular from FIG. 3. To generate different sizes of chamber volumes in order to realize different quarter lambda frequencies, resonator chambers which differ in size and shape may be formed in a noise ring.

As shown in particular in FIG. 3, the openings 28 of the chambers 23, 23' are closed, in the installed state, by the respectively adjacent wall regions 30 of the housing inlet connecting piece 20.

To supplement the above disclosure, reference is explicitly made to the diagrammatic illustration in FIGS. 1 to 3 of the invention.

LIST OF REFERENCE SYMBOLS

ATL Exhaust-gas turbocharger
1 Compressor
2 Turbine housing
3 Compressor housing
4 Turbine wheel
5 Adjusting ring
6 Blade bearing ring
7 Guide blades
8 Blade shaft
9 Feed duct
10 Axial connecting piece
11 Actuating device
12 Control housing
13 Free space for guide blades 7
14 Plunger member
15 Annular part of the turbine housing 2
16 Spacer/spacer cam
17 Compressor wheel
18 Guide grate/guide apparatus
19 Bearing housing
20 Housing inlet connecting piece
21 Noise ring
22 Outer circumference
23, 24, 23', 24' Chambers
25 Base region
28 Openings
29, 30 Wall region
31 Spacer disk
32 Countersunk screw
33, 34, 35, 36 Fillister-head screw

The invention claimed is:

1. A compressor (1) of an exhaust-gas turbocharger (ATL), having a compressor housing (3)
   in which a compressor wheel (17) is arranged,
   which has a housing inlet connecting piece (20) and
   which has a noise ring (21) arranged in the housing inlet connecting piece (20),
wherein
   the noise ring (21) is provided with a multiplicity of blind chambers (23, 24, 23', 24') which are open axially toward the compressor wheel (17).

2. The compressor (1) as claimed in claim 1, wherein the chambers (23, 24, 23', 24') are axial bores which are open at one side toward the compressor wheel (17).

3. The compressor (1) as claimed in claim 1, wherein the noise ring has an outer circumference, and the chambers (23, 23') open toward the outer circumference (22) of the noise ring.

4. The compressor (1) as claimed in claim 1, wherein the chambers (23, 23') have a rounded base region (25).

5. The compressor (1) as claimed in claim 1, wherein the axially open chambers (23, 23') are closed in the radial direction, in the installed state, by a respectively adjacent wall region (29 or 30) of the housing inlet connecting piece (20).

6. The compressor (1) as claimed in claim 1, wherein the chambers (23, 24, 23', 24') are all of equal size.

7. The compressor (1) as claimed in claim 1, wherein the chambers (23, 24, 23', 24') are different.

8. A compressor (1) of an exhaust-gas turbocharger (ATL), having a compressor housing (3)
   in which a compressor wheel (17) is arranged,
   which has a housing inlet connecting piece (20) and
   which has a noise ring (21) arranged in the housing inlet connecting piece (20),
wherein
   the noise ring (21) has a conical upstream surface and a planar downstream surface, and wherein the planar downstream surface of the noise ring (21) is provided with a multiplicity of blind chambers (23, 24, 23', 24') which are open axially toward the compressor wheel (17).

9. The compressor (1) as claimed in claim 8, wherein the multiplicity of chambers (23, 24, 23', 24') which are open axially toward the compressor wheel (17) are not open radially, and are not open on the conical upstream surface of the noise ring (21).

\* \* \* \* \*